United States Patent [19]

Wang et al.

[11] Patent Number: 5,315,506
[45] Date of Patent: * May 24, 1994

[54] CORRECTION FOR COMPTON SCATTERING BY ANALYSIS OF SPATIALLY DEPENDENT ENERGY SPECTRA EMPLOYING REGULARIZATION

[75] Inventors: Xiaohan Wang; Kenneth F. Koral; Neal H. Clinthorne; W. Leslie Rogers; Jeffrey M. Slosar, all of Ann Arbor, Mich.

[73] Assignee: University of Michigan, Ann Arbor, Mich.

[*] Notice: The portion of the term of this patent subsequent to Jun. 13, 2006 has been disclaimed.

[21] Appl. No.: 812,589

[22] Filed: Dec. 20, 1991

Related U.S. Application Data

[63] Continuation-in-part of Ser. No. 53,242, May 22, 1987, Pat. No. 4,839,808, and a continuation-in-part of Ser. No. 331,993, Mar. 31, 1989, Pat. No. 5,081,581.

[51] Int. Cl.$^5$ .............................................. G06F 15/42
[52] U.S. Cl. .......................... 364/413.19; 364/413.14; 364/413.24; 378/901
[58] Field of Search ...................... 364/413.19, 413.14, 364/413.24; 378/901

[56] References Cited

U.S. PATENT DOCUMENTS

| | | | |
|---|---|---|---|
| 4,575,810 | 3/1986 | Stoub | 364/581 |
| 4,780,823 | 10/1988 | Stoub et al. | 364/413.13 |
| 4,839,808 | 6/1989 | Koral et al. | 364/413.24 |
| 5,081,581 | 1/1992 | Koral et al. | 364/413.24 |

Primary Examiner—Roy N. Envall, Jr.
Assistant Examiner—Gita Shingala
Attorney, Agent, or Firm—Rohm & Monsanto

[57] ABSTRACT

A method of reducing the effects of Compton scattered photons detected in a gamma ray detection arrangement includes the steps of receiving data responsive to energy states of the detected photons and storing the data in memory locations corresponding to predetermined image grid points, grouping the stored data, whereby a coarser grid having fewer image grid points is produced, calibrating the gamma ray detection arrangement by utilizing a spectral shape corresponding to a calibration function which is expected to correspond to a first data set corresponding to unscattered ones of the detected photons, processing the stored data for at least selected ones of the predetermined grid points employing minimization of a function which includes a product of an energy regularization term times an energy regularization parameter, as well as a spatial regularization term times a spatial regularization parameter, for separating the stored data into the first data set corresponding to unscattered ones of the detected photons and a second data set corresponding to scattered ones of the detected photons, summing the first data set for each of the predetermined grid points on the coarser grid for determining a number of the unscattered ones of the detected photons, interpolating from the first data set for each of the predetermined grid points on the coarser grid for producing a data set corresponding to the unscattered ones of the detected photons for each of the predetermined number of grid points; and forming an image utilizing the number of the unscattered ones of the detected photons.

15 Claims, 8 Drawing Sheets

CORRECTION FOR COMPTON SCATTERING BY ANALYSIS OF SPATIALLY DEPENDENT ENERGY SPECTRA EMPLOYING REGULARIZATION

GOVERNMENT RIGHTS

This invention was made under Grant No. R01 CA38790, awarded by the National Cancer Institute, DHHS. The government has certain rights in the invention.

RELATIONSHIP TO OTHER PATENT APPLICATION

This application for United States Letters Patent is a continuation-in-part of Ser. No. 053,242, filed May 22, 1987, now issued as U.S. Pat. No. 4,839,808 and Ser. No. 07/331,993, now U.S. Pat. No. 5,081,581 filed Mar. 31, 1989, both assigned to the same assignee as herein.

BACKGROUND OF THE INVENTION

This invention relates generally to systems for achieving imaging employing radioisotopes, and more particularly, to a system which obtains and stores an energy distribution in a computer memory as data acquisition progresses, which distribution then is processed to separate same into scattered and direct components.

The purpose of cameras of the type used for radioisotope imaging is to provide an accurate assessment of the distribution of radioisotope within an object from measurements made outside the object. In the particular case of a scintillation camera, gamma rays are detected by a solid crystal and their energy converted into light. The function of the detection circuitry is to determine where in space the gamma ray was detected. A collimation system and a reconstruction algorithm then are employed to obtain a correspondence to be determined between the gamma ray detection location and a location in the object from which the gamma ray originated.

By detecting many gamma rays over time, the distribution of radioisotope emitting the gamma rays is determined. When gamma rays are emitted from deep within an object, however, there is a good possibility that they will undergo one or more Compton scatterings, i.e., changing their direction and losing some energy each time, before they emerge from the object. These gamma rays can therefore approach the scintillation camera from a direction which does not correspond to that of their true origin. If detected and processed as usual, they will be misassigned and the radioisotope distribution which ultimately is obtained will be incorrect.

To reduce effect of this source of error, present cameras determine the energy of the detected gamma rays. If a gamma ray has lost a large amount of energy in scattering, it is not accepted for further processing. Because of inaccuracies in the energy determination, however, a fairly wide window of allowable energies has to be used to accept almost all of the direct (that is unscattered) gamma rays. This wide window leads to the acceptance of a significant number of scattered gamma rays.

The present invention is directed to the rejection of all scattered gamma rays. Thus, only direct gamma rays will be processed and radioisotope distributions will be determined in a way which is qualitatively and quantitatively accurate.

One of the known methods for rejecting scattered gamma rays utilizes the concept of an energy window. This window can be set symmetrically about the peak in the energy distribution (number of gamma rays given as a function of energy of the gamma ray) or it can be set asymmetrically about that peak. In addition, one scheme has proposed obtaining energy distributions for different spatial locations on the planar face of the scintillation camera and using different energy windows for different spatial locations. This scheme is disclosed in U.S. Pat. No. 4,212,016 which issued Jul. 8, 1980 to Knoll, Strange, and Bennett and entitled "Radiation Signal Processing System."

A further known method for rejection of such scattered gamma rays utilizes two energy windows: one set symmetrically about the direct peak and one of equal width set adjacent to that window but at lower energies. A fraction of the image of the radioisotope distribution that is reconstructed from gamma rays accepted within this reduced-energy window is subtracted from the image reconstructed using the direct, Le., unscattered, gamma rays.

A related method for handling the problem of Compton-scattered gamma rays involves calculating their true origin. This reconstruction method is called "Inverse Monte Carlo" reconstruction. It solves the photon transport equation for single photon emission computed tomography acquisitions.

The method disclosed in U.S. Pat. No. 4,839,808, which issued Jun. 13, 1989 in the names of some of the inventors herein, involved acquiring a full energy spectrum at every spatial location on the camera. In a calibration step, the spectrum from a pure radioisotope source, which was small in extent so as to prevent scattering, was also utilized. A minimization was then carried out for the difference of two functions to obtain a function for the unscattered gamma rays. In the known grandparent invention, the second function in the difference depends linearly on its parameters and so the method of linear least squares was employed in the minimization.

In a continuation-in-part parent patent application filed Mar. 31, 1989, (U.S. Ser. No. 07/331,993 now U.S. Pat. No. 5,081,581 the second function in the-difference depends non-linearly on its parameters and therefore non-linear least squares was utilized.

U.S. Pat. No. 4,575,810 which issued Mar. 11, 1986 to Everett W. Stoub and entitled "Method and Circuit for Processing Pulses by Applying the Technique of Weighted Acquisition", proposed detecting the energy content of gamma rays from an internal radioactive decay after emergence from the body for the purpose of correcting for gamma-ray scattering. This known technique appears to be directed only to achieving improvement in image contrast, and permits bias in their estimates.

In a further known system for detecting the energy content of gamma rays for Compton scattering correction, the processing method is based on multivariate-analysis techniques. In yet another known system, processing is based on constrained factor analysis.

It is a problem with the known systems and methods that the use of a single energy window does not lead to the complete rejection of gamma rays which have undergone Compton scattering. More specifically, as the window is made more narrow or is set asymmetrically toward higher energies, the ratio of scattered gamma rays over direct gamma rays is made smaller but the total number of direct gamma rays which are accepted is made smaller also. Statistical fluctuations in the determined radioisotope distribution get worse as the number of direct gamma rays gets smaller. Therefore, to avoid unacceptable statistical fluctuations, a significant number of scattered gamma rays usually have to be accepted. The use of energy windows which vary with spatial location improves the situation, but does not solve the underlying problem.

In the known systems which use two adjacent energy windows, one investigator has noted that the fraction, k, used to multiply the image from the lower window before subtraction from the upper window image is dependent on the source distribution. In support of this contention, it is noted that employing on-axis and off-axis (8 cm from the axis of the cylinder) line sources placed within 22 cm diameter cylindrical phantom, yields values of k which have been experimentally measured to be equal to 0.66 and 0.47 for the on-axis and off-axis positions, respectively. This variation of the k fraction with the radioisotope distribution means that it is impossible to obtain the radioisotope distribution in a straight-forward or practical manner. In other words, one can find the correct k value only if one knows the distribution, and one can only find the distribution if one already knows the k value.

A characteristic of the Inverse Monte Carlo method appears to be that the cross section for absorption and the cross section for scattering must be known independently for all points within the object. In addition, the Inverse Monte Carlo method is quite slow in producing an image with present-day computing facilities. This slowness appears to be inherent in the method since the total object must be reconstructed for the method to work accurately.

The method disclosed in the aforementioned U.S. Pat. No. 4,575,810 to Stoub requires measuring camera energy-spatial spread functions for point sources imbedded in a particular scattering medium. This scattering medium can only be an approximation to the true situation in patients and, accordingly, there must be bias errors in the estimates therein disclosed.

The aforementioned linear least squares method is sensitive to statistical noise in the measurement of the spectra. Grouping of the data has been applied to reduce this noise. In a practical image, such grouping can lead to a difficult interpolation problem to get back to the fine grid needed for reconstruction. Simulations have shown that the linear least squares estimates are also sensitive to the choice made for the range of the energy spectra used in fitting (called the "fitting window"). In practical situations, the optimum choice is not known, and a suboptimal choice may be made leading to error in the estimate.

Lastly, the linear least squares and the non-linear least squares systems both require post-processing solutions to the minimization. This post-processing requirement means that the solution can be available only some finite time after data acquisition. The patient dismissal from the imaging area is delayed by this amount of time, resulting in additional expense and diminution of resource utilization.

It is, therefore, an object of this invention to provide a radioisotope imaging system which rejects all scattered gamma rays.

It is another object of this invention to provide an imaging system that eliminates all scatter and thereby provides an unbiased estimate.

It is also an object of this invention to provide a system wherein rejection of scattered gamma rays can be accomplished for any distribution of radioisotope in the object or patient.

It is a further object of this invention to provide a system in which computation time is feasible.

It is an additional object of this invention to provide a system which is operable in real time.

It is another object of this invention to provide a system which allows for energy shifts between the spectrum of direct gamma rays corresponding to the scatter-free source calibration, and the local spectra of direct gamma rays acquired from the patient or object.

It is additionally an object of this invention to provide a system which is applicable to single-photon projection (planar) imaging.

It is yet a further object of this invention to provide a system which is applicable to single-photon emission computed tomography.

It is also another object of this invention to provide a system which is applicable to positron emission computed tomography.

It is yet an additional object of this invention to provide a system which is applicable to NaI (Tl), BgO and other scintillation materials.

It is still another object of this invention to provide a system wherein quantitatively accurate image reconstruction is achieved.

It is a yet further object of this invention to provide a system in which all of the direct (unscattered) gamma rays which are detected in the crystal are used for formation of the image.

It is also a further object of this invention to provide a system which can be applied to any number of tomographically-reconstructed planes through the body.

It is additionally another object of this invention to provide a system which reduces computation time when only a relatively small number of planes are of interest.

A still further object of this invention is to provide a system which is insensitive to noise.

An additional object of this invention is to provide a system which remains stable when noise is present in the data.

SUMMARY OF THE INVENTION

The foregoing and other objects are achieved by this invention which provides, in accordance with a first method aspect thereof, a method of reducing the effects of Compton scattered photons detected in a gamma ray detection arrangement. In accordance with the invention, the method includes the steps of:

receiving data responsive to energy states of the detected photons and storing the data in memory locations corresponding to predetermined image grid points;

calibrating the gamma ray detection arrangement by utilizing a spectral shape corresponding to a calibration function which is expected to correspond to a first data set corresponding to unscattered ones of the detected photons and by utilizing spectral shapes for monoenergetic gamma rays the energies of which are higher than the energy of the gamma ray of primary interest and by utilizing spectral shapes for monoenergetic gamma rays whose energies are lower than the energy of the gamma ray of primary interest;

processing the stored data for at least selected ones of the predetermined grids point using as a model of the unscattered spectrum a set of parameters, one for each energy channel, and employing minimization of a function which includes a product of an energy regularization term times an energy regularization parameter, for separating the stored data into the first data set corresponding to unscattered ones of the detected photons and a second data set corresponding to scattered ones of the detected photons;

summing the first data set for each of the selected ones of the predetermined grid points for determining a number of the unscattered ones of the detected photons; and forming an image utilizing the number of the unscattered one of the detected photons.

In a specific embodiment of the invention, the step of minimization includes the further step of inverting a matrix. In a still further embodiment, there are provided the further steps of preselecting an energy regularization parameter, saving the results of said step of inverting in a computer memory, and computing an image in real time.

In the post processing implementation, the invention involves obtaining the energy distribution and storing it in computer memory as the data acquisition progresses. Only events which are very far from the "direct" peak are immediately rejected by the energy window. After acquisition, this energy distribution or spectrum is computer processed to separate it into a scattered component and a direct component. The total number of gamma rays included in the direct component is then found by summation from one tail of the direct peak to the other. This number is then used for all further image formation. In this way, all of the direct gamma rays which have been detected are included for further processing. All of the scattered gamma rays are rejected. The least statistical fluctuation in images which are qualitatively and quantitatively accurate is obtained.

The new method set forth in this disclosure involves a technique for describing mathematically the scatter and provides more flexibility than known systems. Therefore, more complicated spectral shapes can be handled using the present invention. A previous method developed by the inventors herein assumed a polynomial dependence on energy for the scatter spectrum. Thus, only globally smooth spectral shapes could be handled accurately. The only alternative for globally complicated shapes was a high order polynomial. This alternative is unstable for noisy data, however, and leads to estimates with fairly large error.

One aspect of the present invention removes the use of polynomials altogether. With this aspect, the equations for processing the data generally describe the scatter energy spectrum by allowing a separate parameter for every energy channel within the fitting window. Thus, a very complicated shape can be realized. This method would again be potentially unstable for noisy data. In order to solve the problem of instability with noisy data, the inventors have added an energy-regularization term to the function being minimized. The relative importance of this term is determined by an energy-regularization parameter. The purpose of the term is to regulate the local smoothness of the final solution. In tests, it has been found that with the optimum energy-regularization parameter, estimates of unscattered counts can be more accurate than with the polynomial method. This increase in accuracy is especially true for noisy data. Moreover, the estimate is not excessively sensitive to the value of the energy-regularization parameter, and therefore great care is not required in selecting the value.

Finally, with a preselected, fixed value of the regularization parameter, the matrix-inversion solution for the minimizations can be implemented in real time. That is, for a given summation window, the image of unscattered counts can be obtained as the data is being acquired rather than as the result of postprocessing. This feature does not require measuring camera energy-spatial spread functions from point sources imbedded in a scattering medium for implementation.

Two further aspects of the present invention involve spatial regularization, which can be used to relieve the noise problem when high-order polynomials are employed or to offer an alternative to the grouping of data to obtain smoothness in the scatter estimate over space. This smoothness is present in all physical cases and therefore is desirable. The method incorporates the adding of a spatial-regularization term to the function being minimized. The relative importance of this term is governed by a spatial-regularization parameter. The term itself can be added either to the minimization known from the parent patent with polynomial scatter, or as a second regularization term in the non-polynomial method described hereinabove. In the first case, given polynomial coefficients would be smoothly varying in local space. In the second case, the parameter for given energy channels would be smoothly varying in local space. In both cases, the resultant estimate of scatter would be smoothly varying in space as desired without having to group data and then interpolate back to a fine grid.

An auxiliary feature of this invention is that with post-processing one can step through various values for the energy shift between the energy channel of the peak of the spectrum of the gamma rays from the patient or source and the energy channel of the peak of the scatter-free-source spectrum. The minimization is performed for each value of shift. Then the correct shift is chosen by a specified criterion, such as the smallest value of the quantity being minimized. This searching procedure can be utilized in either of the two aspects of the invention which employ energy regularization. This auxiliary feature of the invention allows for local energy shifts due to the conditions under which the primary data is acquired compared to the conditions for the scatter-free-source calibration.

It is a feature of the present invention that Compton-scattered gamma rays are completely rejected before final image formation. Additionally, rejection can be accomplished for any distribution of radioisotope in the object or patient. In addition, computation time is feasible, and the method is applicable to 1) single-photon projection (planar) imaging, 2) single-photon emission computed tomography and 3) positron emission computed tomography.

The present invention is applicable to NaI (T1), BgO and other scintillation materials. Quantitatively accurate reconstruction is made possible. It is another feature of the invention that all of the direct (unscattered) gamma rays which are detected in the crystal can be used for formation of the image.

The method of the present invention allows for the use of the extra information associated with a scatter-free calibration step. The present method can be applied to any number of tomographically-reconstructed planes through the body, thus potentially reducing the computation time when only a small number of planes are of interest.

Two of three aspects of the invention allow for the use of extra information obtained from both gamma rays whose energy is lower and those whose energy is higher than the primary gamma ray.

Two of three aspects of the invention allow for globally complicated spectral shapes without resorting to high order polynomials which are sensitive to noise. In simulated tests, energy regularization alone (without spatial regularization) has been shown to be less sensitive to noise than the cubic or fifth-order polynomials used previously. In simulated tests at three different noise levels, energy regularization alone (without spatial regularization) has shown itself to be less sensitive to the choice of the fitting window compared to the cubic polynomial used previously. In addition, energy regularization with spatial regularization reduces the need for grouping the data, thereby eliminating the potentially problematic interpolation back to a fine grid. Spatial regularization alone (without energy regularization) also tends to smooth out inaccurate estimates when employing polynomials. All three aspects of the present invention can be implemented in real time.

BRIEF DESCRIPTION OF THE DRAWING

Comprehension of the invention is facilitated by reading the following detailed description, in conjunction with the annexed drawing, in which.

DETAILED DESCRIPTION

Figure 1:
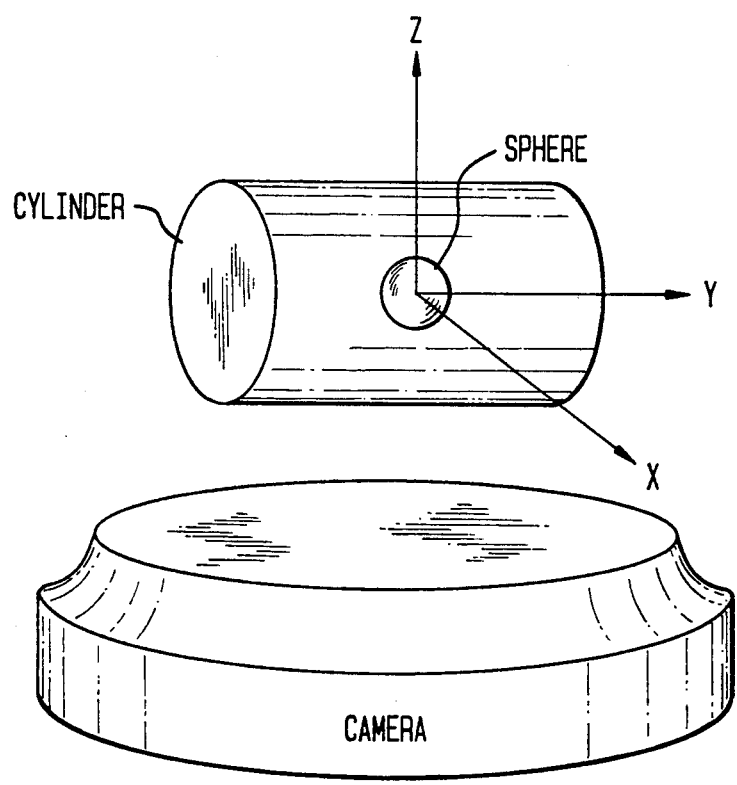
FIG. 1 is a simplified schematic representation of the phantom and gamma-camera geometry used for tests described in the following description.

The calibration part of the parent patent specifies that an energy spectrum for a scatter-free radioactive source is to be utilized. Thus this source is small in spatial extent. It contains the radionuclide of interest. For the new invention, a further part of the calibration process requires utilizing the energy response of the detection device for monoenergetic gamma rays sources of energies which are successively higher and successively lower than the energy of the gamma ray for the radionuclide of interest.

A. ENERGY REGULARIZATION ONLY

When employing only energy regularization, the spectrum, f, of the scatter free source comprises the last column of a matrix U which has m rows and n columns. The other (n−1) columns of U are filled by the energy-response spectra. The left-most column corresponds to the lowest impinging gamma-ray energy and the (n−1)th column to the highest. All columns have the lowest detected energy signal channel at the top and the highest at the bottom.

Further, define the energy spectrum detected at a given spatial location as column vector a. It is of length m with the lowest energy channel at the top and the highest at the bottom. Also, define the estimate of the scatter part of the observed object spectrum as column vector s' and b as the estimate of the amplitude of the unscattered spectrum which is assumed to have the same spectral shape, as well as the same centroid, as f. Define further the column vector which is composed of s' plus b as its last element as column vector c. This vector has length n.

Also, Q is an n row by n column matrix that accomplishes first-order finite differences on c. Further W is n row by n column diagonal matrix with all 1's except for the lowest diagonal element which is zero to avoid smoothing between b and s'. Lastly, $\lambda_E$ is a positive scaler constant called the energy regularization parameter.

The minimization for Compton scatter correction with only energy regularization is then $$\min\{ \| a - Uc \| + \lambda_E \| WQc \| \} \quad (1)$$

where $\| \cdot \|$ represents the quadratic norm of a vector, and min $\{\cdot\}$ means to find the vector c which minimizes the value of the quantity inside. The value of $\lambda_E$ must be preselected. Techniques such as cross-validation methods might be employed to optimize its value. The minimization is carried out independently at different spatial locations.

The solution for the minimization problem is worked out through the rules for derivatives of matrices with respect to a vector, etc. and is found to involve a matrix inversion. That is:

$$c = (U^t U + \lambda Q^t W^t W Q)^{-1} U^t a \quad (2)$$

where matrices $U^t$, $Q^t$ and $W^t$ are the transposes of matrices U, Q and W, respectively.

B. BOTH ENERGY AND SPATIAL REGULARIZATION

To add spatial regularization, we reformulate the problem to include spatial dimensions. We define a new column vector â to be of length mN where N is the total number of pixels. It is the concatenation of all a's. In a similarly manner, we define a column vector $\hat{c}$ with length nN and a matrix $\hat{U}$ with mN rows and nN columns. $\hat{U}$ is a banded matrix:

$$\hat{U} = \begin{pmatrix} U_1 & & & & \\ & U_2 & & & \\ & & \cdot & & \\ & & & \cdot & \\ & & & & U_N \end{pmatrix}, \quad (3)$$

where $U_i$ is the U matrix for the ith pixel as previously defined. Also, $\hat{Q}_E$ is a nN row by nN column matrix that accomplishes first-order finite differences in the energy dimension, $\hat{W}$ is a nN by nN diagonal matrix, and $\hat{Q}_x$ is a nN row by nN column matrix that accomplishes first-order finite differences in the spatial dimensions. $Q_E$ and W can be constructed from Q and W in a manner similar to that for constructing $\hat{U}$ from U. $\lambda_E$ and $\lambda_X$ are two positive scaler constants called the energy and spatial regularization parameters. The minimization for Compton scatter correction with both energy and spatial regularization is:

$$\min\{ \|\hat{a} - \hat{U}\hat{c}\| + \lambda_E \|\hat{W}\hat{Q}_E\hat{c}\| + \lambda_X \|\hat{Q}_x\hat{c}\| \}. \quad (4)$$

where $\|\cdot\|$ and $\min\{\cdot\}$ are the same as defined before. The minimization for the whole energy spectral image is carried out at once. That is, the estimates for all spatial locations are interdependent.

To reduce the computing burden, an alternative formulation expresses the problem in such a way that it only involves a particular center pixel and its neighboring pixels. This is valid because local smoothing is appropriate in the spatial domain. Using a center pixel and four immediate neighboring pixels, for example, we have:

$$\min\{ \|\bar{a} - \bar{U}\bar{c}\| + \lambda_E \|\bar{W}\bar{Q}_E\bar{c}\| + \lambda_X \|\bar{Q}_x\bar{c}\| \}, \quad (5)$$

where a is of length 5 m, cis of length 5 n; U is of size 5 m by 5 n; $Q_E$, W and $Q_x$ are of size 5 n by 5 n. For this approach, the minimization is to be carried out independently at different spatial locations.

C. SPATIAL REGULARIZATION ONLY

Spatial regularization alone can also be used with the polynomial fitting method in the parent patent. Recall that the original method is $$\min\{ \|Bx - a\| \}, \quad (6)$$

where B is a m row by 5 column matrix, x is a vector of length 5, and a is the same vector as previously defined. Again, we define a new mN by 5N matrix $\hat{B}$ and a new vector $\hat{x}$ (of length 5N), in the same manner that the matrix U and the vector $\hat{c}$ were previously defined. Also, a 5N by 5N matrix $Q_p$ is defined which accomplishes finite differences on $\hat{x}$ in the spatial dimensions. $\lambda_P$ is a positive scaler constant called the spatial regularization parameter. The minimization for Compton scatter correction using polynomial fitting with spatial regularization is $$\min\{ \|\hat{B}\hat{x} - \hat{a}\| + \lambda_P \|Q_P\hat{x}\| \}, \quad (7)$$

where $\hat{a}$ is the same vector as previously defined. This minimization for the whole energy spectral image is carried out at once. An approach involving only particular center pixels and their neighboring pixels can again be used to reduce the computing burden.

This spatial regularization alone could also applied to the non-linear least squares minimization of the parent patent application.

D. IMPLEMENTATION AND TESTING OF ENERGY REGULARIZATION AS A POST-PROCESSING TECHNIQUE

The inventors herein have implemented and tested energy regularization for both $Tc^{99m}$ and $I^{131}$ as a post-processing technique. The camera energy resolution function, $R(e,e')$ is assumed to be expressed by:

$$R(e,e') = \frac{1}{\sigma} \sqrt{\frac{2}{\pi}} \exp\left( \frac{-(e-e')^2}{2\sigma^2} \right), \quad (8)$$

where e' is the energy of the channel of interest, and $$\sigma = \frac{re'}{2.35}, \quad (9)$$

where r is a known constant for the camera and isotope. From measurements for the particular camera, $r = 10.8\%$ for $Tc^{99m}$ and $r = 9.8\%$ for $I^{131}$. This specifies the first (n-1) columns of U.

FIG. 1 is a simplified schematic representation of the phantom and gamma-camera geometry used for tests described in the following discussion. The object used in all tests was a cylindrical phantom containing a sphere which could take three different positions along the z-axis. The positions will be referred to as "near," "on-axis," and "far" positions, respectively, according to the distance from the sphere center to the surface of the camera. Both the cylinder and sphere were filled with water. In the case of the hot sphere phantom, the radioactive material was added to the sphere but not to the cylinder. The cold sphere phantom is the opposite, with only the cylinder radioactive.

For both the Monte-Carlo simulations and experiments, spectral projection images were obtained. A spectral image I is a function with two spatial variables x and y and an energy variable e $$I = I(x,y,e). \quad (10)$$

The spatial variables have dimensions of $128 \times 128$ with a pixel size of about 3 mm. The energy variable has 32 channels, ranging from 108 to 172 keV, with a width of 2 keV for $Tc^{99m}$, and from 300 to 427 key, with a width of 3 keV for $I^{131}$. Therefore, the Anger camera spectrum vector a in equation (1) can be any one of the 16,384 vectors below:

$$a = [I(x_i, y_i, e_1), \ldots, I(x_i, y_i, e_{32})]', \quad i,j = 1, \ldots, 128. \quad (11)$$

Energy spectra at a few particular spatial locations were selected for testing. The Monte-Carlo simulation for $Tc^{99m}$ generated separate scattered and unscattered spectral images while the sum is the simulation of the Anger-camera measured spectral image. Monte-Carlo simulation provides a good way of evaluating the performance of the algorithm being tested because the answer is known. The simulated unscattered spectrum at the center of the sphere was used as the required scatter-free spectrum.

Figure 2:
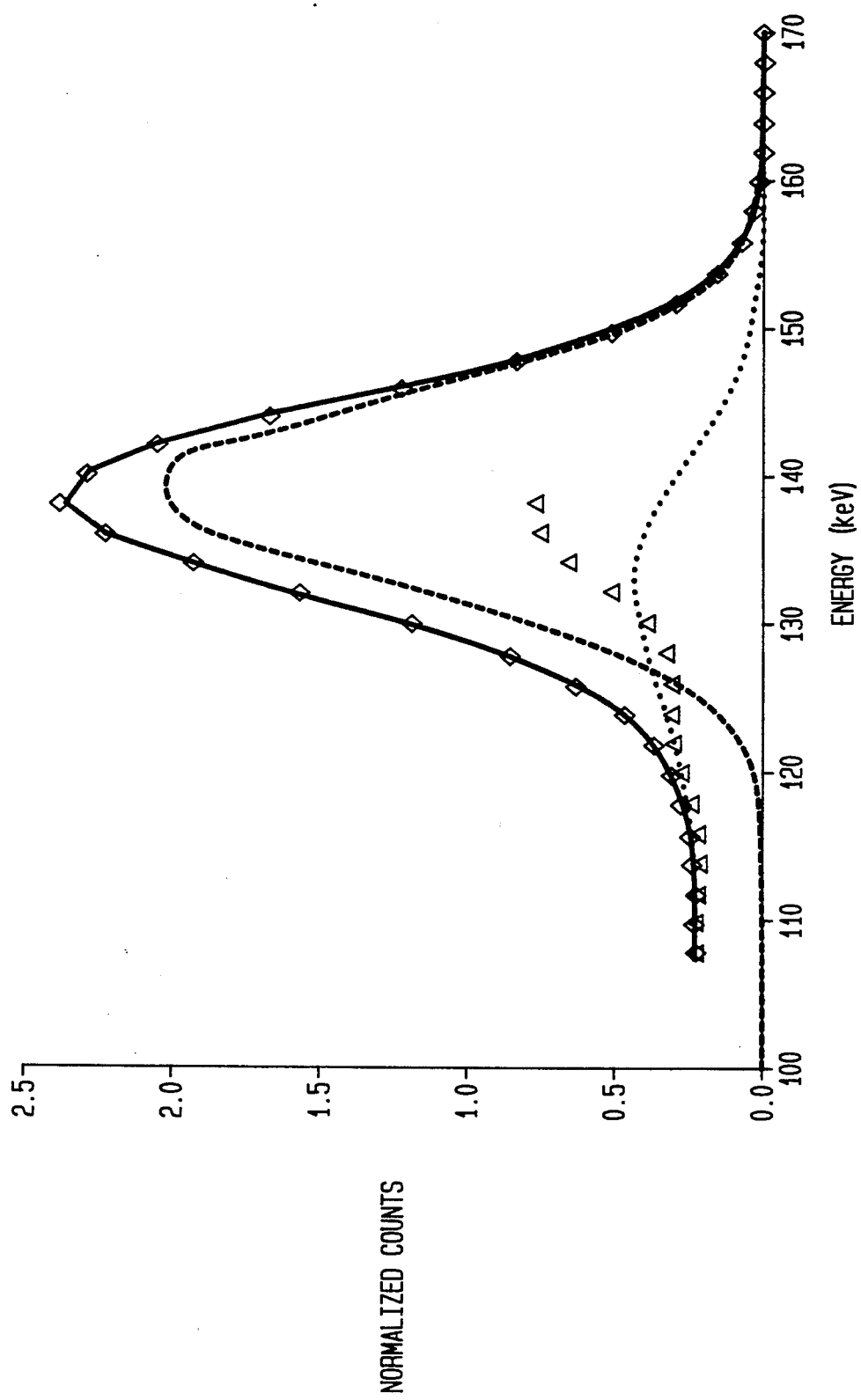
FIG. 2 is a graphical representation which compares typical results from the regularized deconvolution-fitting method for Monte-Carlo simulated high-statistics spectrum at the center pixel of the hot sphere "on-axis" phantom with $Te^{99m}$.

FIG. 2 shows a typical result from the regularized deconvolution-fitting method for Monte-Carlo simulated high-statistics spectrum at the center pixel of the hot sphere "on-axis" phantom with Tc$^{99m}$. Shown are the simulated raw data (diamonds), the fit to the raw data from the correction method (solid curve), the recovered scattered spectrum (triangles), the recovered scattered spectrum after convolution with the camera response function (dotted curve) and the recovered unscattered spectrum (dashed curve).

Another advantage of using Monte-Carlo simulation is the ease of testing the performance at various counting levels. To do this, a Monte-Carlo simulation with a very large number of histories was first run to generate an essentially noise-free, or near-perfect, spectral image. Then, the near-perfect spectrum vector at a specific spatial location is combined with a Poisson random number generator to simulate the actual counting noise at a certain level. The noise level was measured by the total number of counts in the photopeak energy window. In our case, it was a 20% window. The noisy spectra were then processed by the proposed energy regularization method. The result is the total number of scatter-corrected counts in the photopeak energy window. This process was repeated 100 times for every noise level tested. There were 10 different noise levels, ranging from very noisy (100 counts/pixel) to less noisy (5000 counts/pixel). The following average relative error was measured for every noise level:

$$Err = \frac{\sum_{i=1}^{100} |N_i - N|}{100N} \quad (12)$$

where $N_i$ is the total number of corrected counts in the photopeak window for the ith simulation at a certain counting level, N is the total number of true unscattered counts in the same window without noise, and $|x|$ is the absolute value of x.

The regularization parameter controls the smoothing and thus the final error. An optimization procedure was carried out manually at every tested noise level to find the parameter that would result in minimum relative error.

Figure 3:
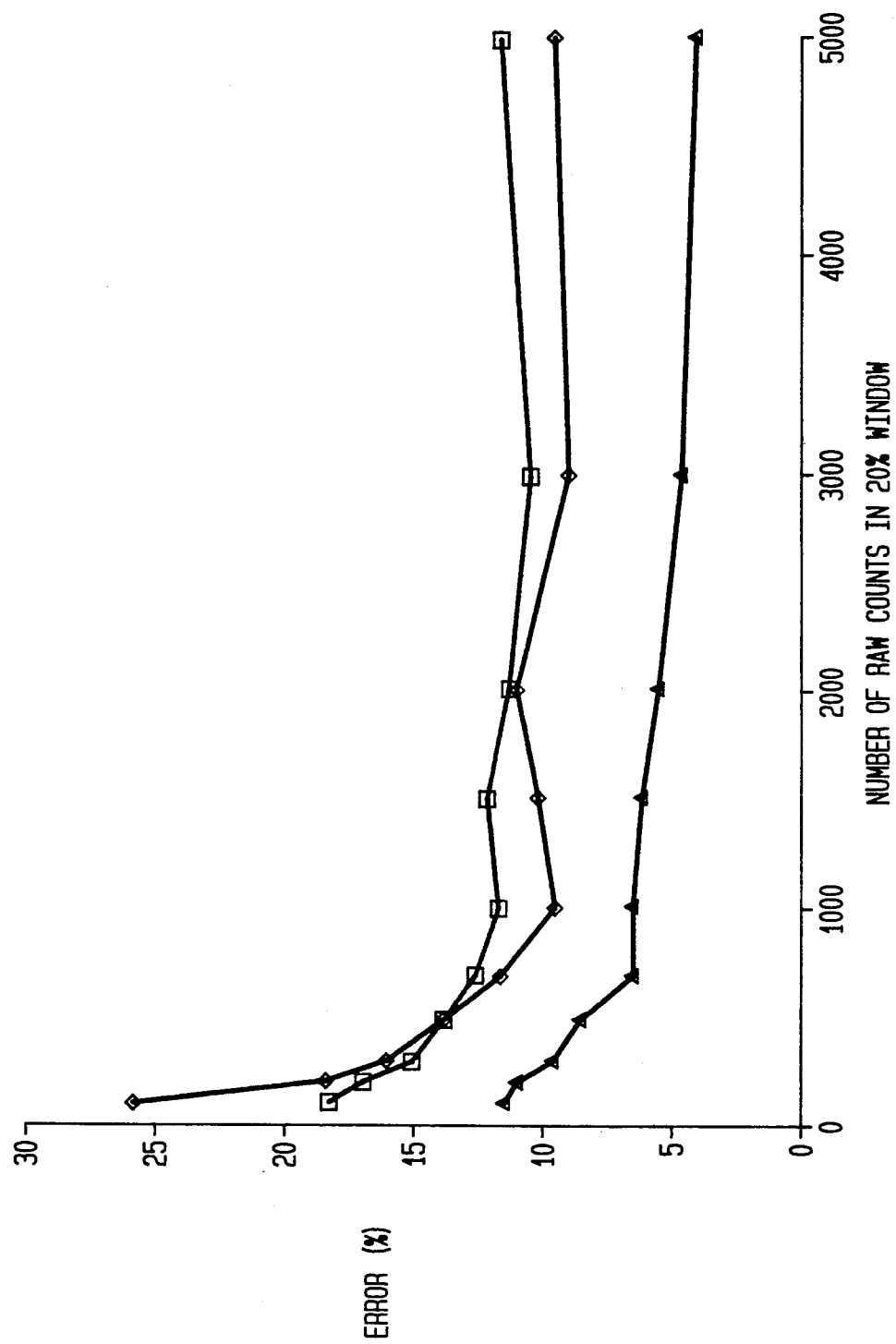
FIG. 3 is a graphical representation which compares average errors plotted against the total number of counts in the photopeak window for the regularized method and the polynomial method with $Tc^{99m}$.

FIG. 3 shows the minimum errors for the center pixel of the hot sphere "on-axis" phantom, plotted against the total number of counts in the photopeak window. The spectral data were from the center pixel of the hot sphere "on-axis" phantom with Tc$^{99m}$. Also plotted in the figure are results of the parent-patent polynomial method with both cubic and 5th order polynomials for the same data. The diamonds are errors with 5th order polynomial, the squares are those with cubic polynomial and the triangles are those with the regularized method. The fitting window used for both methods was wide, from channel 3 to channel 27, or, 113 to 163 keV (denoted WW). The regularized method resulted in smaller errors than the older method at all counting levels. The errors from the new method are reduced by a factor of about 1.6, comparing with those using the polynomial, when the total number of counts is less than 1000. The factor increases to 2 when the total number of counts is equal to or greater than 1000. Similar results were also obtained for a pixel at the edge of the hot sphere.

One potential problem with the polynomial method is its sensitivity to the choice of fitting window. This sensitivity was reported in the literature for high count data. To test the new method with respect to sensitivity to the choice for the range of the energy spectra, we ran the same test with both a wide window (WW) and a narrower window, which is the same as the photopeak window, 126–154 key (denoted NW).

Figure 4A:
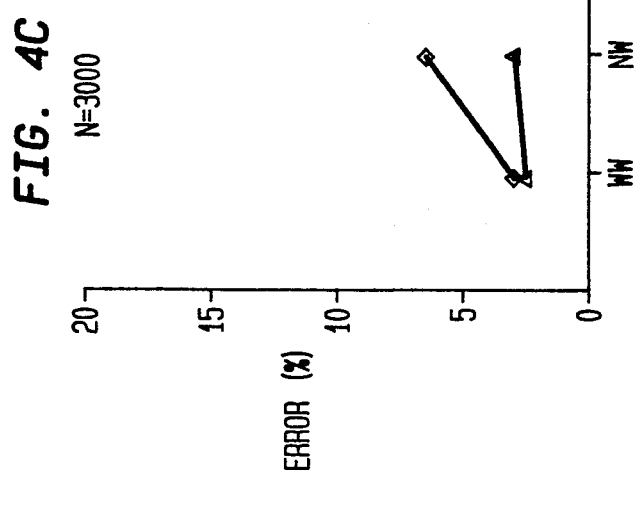
FIGS. 4a–4c are a graphical representation which compares sensitivity to the fitting-window width for regularized method and cubic polynomial method for three count levels (WW: wide window; NW: narrow window) with $TC^{99m}$.
Figure 4B:
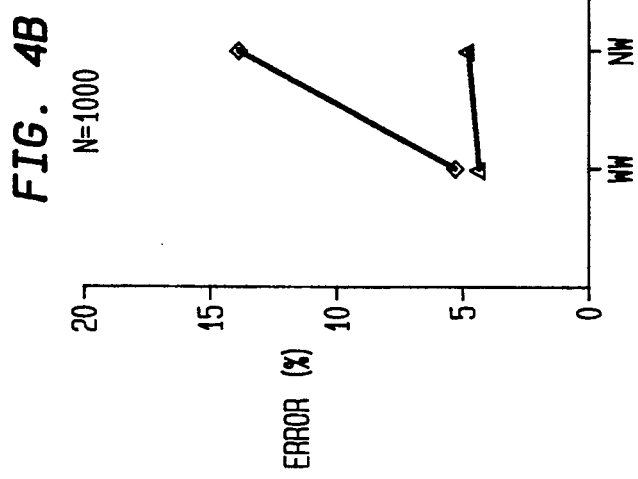
Figure 4C:
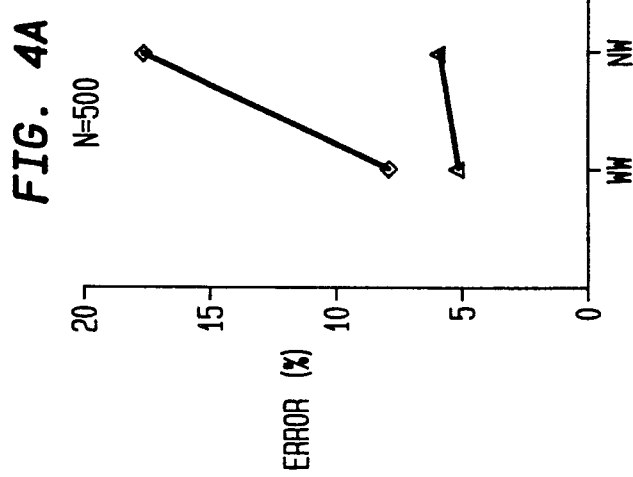

FIGS. 4a–4c compares the errors from both the regularized and the cubic polynomial methods for the center pixel of the cold sphere "on-aids" phantom with Tc$^{99m}$ for three count levels: low (an average of 500 photons in photopeak window), medium (1000 photons) and high (3000 photons). Results show that the new regularized method appears less sensitive to fitting window size than the polynomial method.

Figure 5:
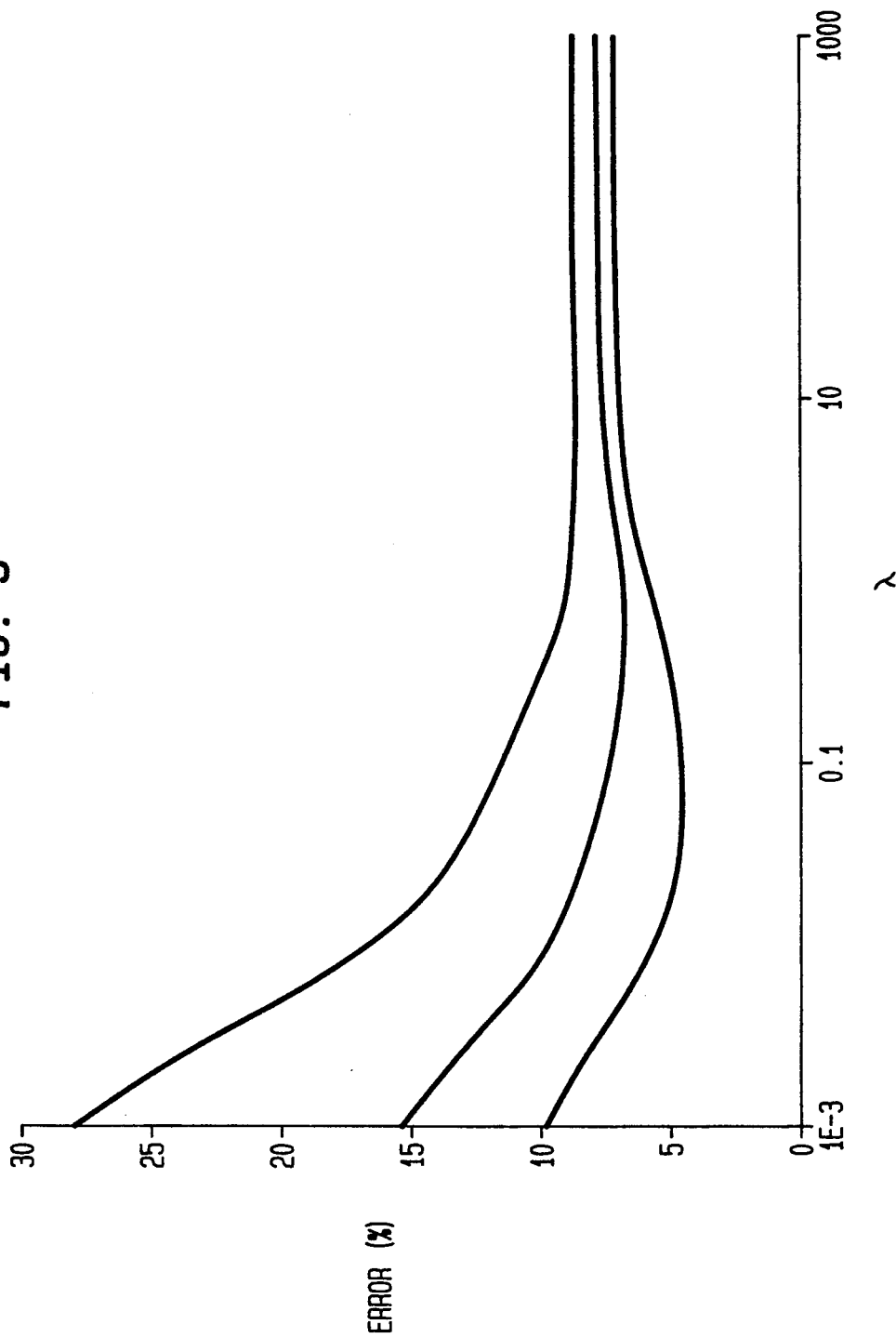
FIG. 5 is a graphical representation which compares average error versus λ for a pixel at the center of the hot sphere "on-aids" phantom with $Tc^{99m}$ for: 500 (top curve), 1000 (middle curve), and 3000 counts (bottom curve)

To achieve the best possible results, the regularization parameter could be object and location dependent. However, the inventors herein have found that the error is not very sensitive to the choice of the parameter, especially for low count (high noise) data. Shown in FIG. 5 are plots of measured error versus A for the center pixel of the hot sphere on-axis phantom with a narrow fitting window for 3 count levels, Le., 500, 1000 and 3000 (from top curve to bottom curve in the figure). The curves depict how the error changes when the parameter λ increases, for different count levels. In the low count level case, the error curve becomes flat and reaches the minimum error due to high noise suppression. The choice of the parameter is not critical so long as it is sufficiently large in this case, because any value greater than one would yield the same results. In the medium and high count level cases, as λ increases, the error curves reach a minimum, and then rise slightly to reach a flat region. However, the increase from the best possible error is small (about two percent in the case of 3000 counts).

With experimentally measured data, no true results are known. One measurement often used for the scatter estimation is the so-called scatter fraction. For a given photopeak window, it is defined as the ratio of the total number of scattered counts to that of unscattered counts. Note, even though it is called a fraction, it can have a value greater than one. The experimental data used for testing were of high count levels. The spectral images were regrouped spatially to a coarser grid to further increase the counts per pixel. Monte-Carlo simulation, where available, was again used in these tests for comparison.

Figure 6A:
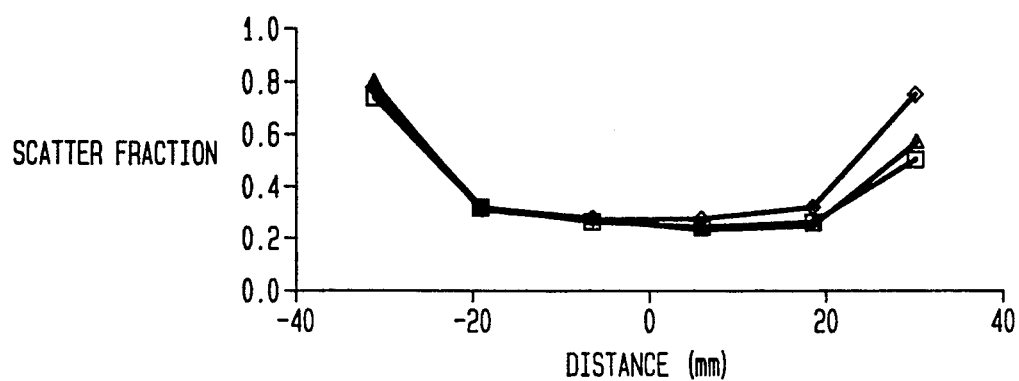
FIG. 6a–6c are a graphical representation which compares scatter fractions from the energy regularized method (squares), cubic polynomial method (diamonds) and Monte-Carlo simulation (triangles) for hot sphere phantoms with $Tc^{99m}$: (a) "far" (b) "on-axis," and (c) "near;"
Figure 6B:
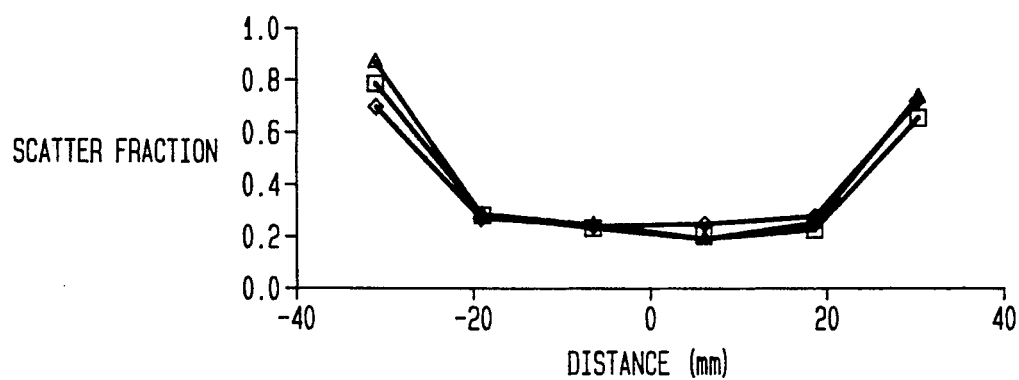
Figure 6C:
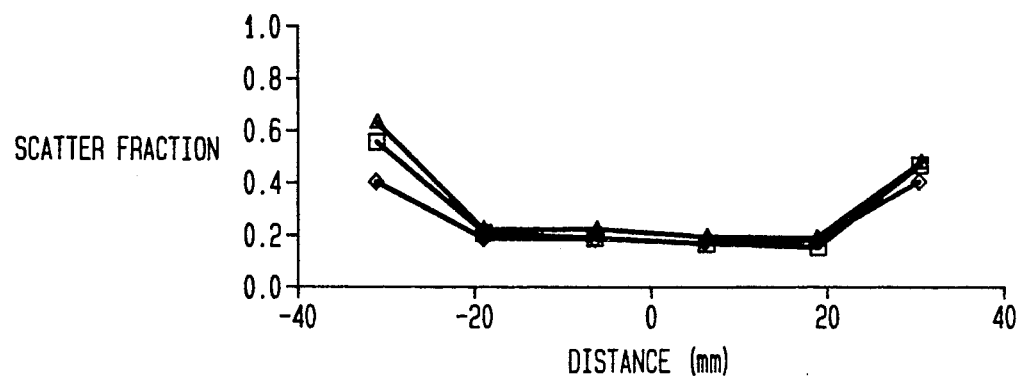
Figure 7A:
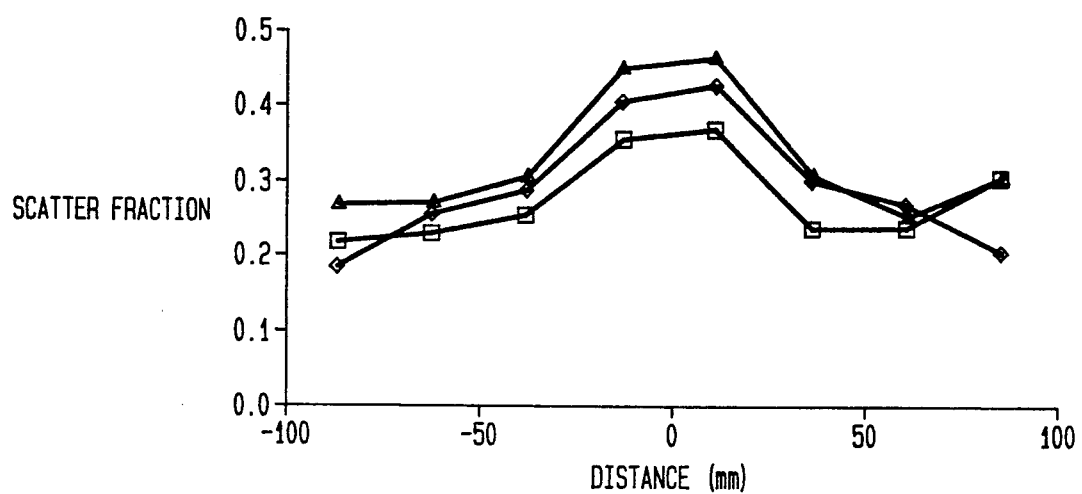
FIGS. 7a–7b are a graphical representation which compares scatter fractions from the energy regularized method (squares), cubic polynomial method (diamonds) and Monte-Carlo simulation (triangles) for cold sphere phantom with $Tc^{99m}$: (a) along x-axis and (b) along y-axis.
Figure 7B:
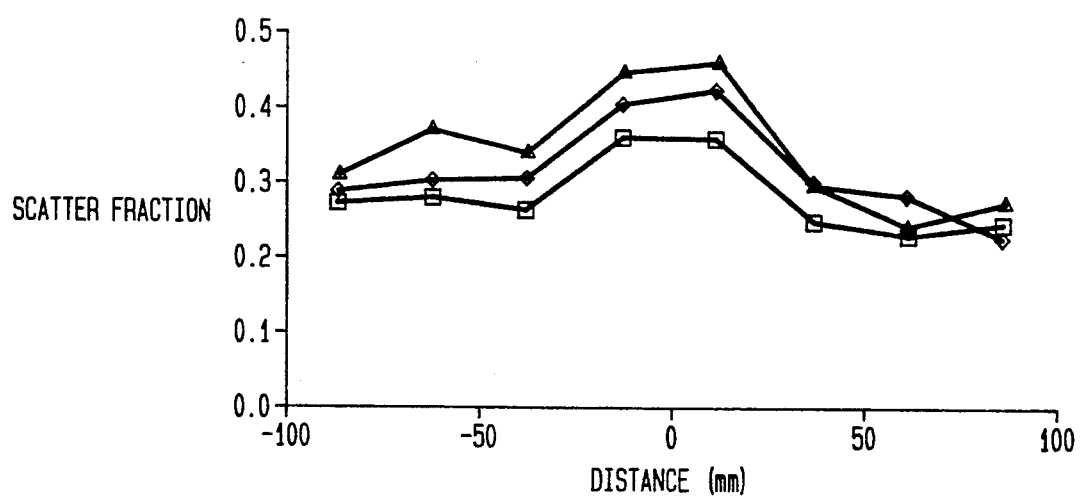

FIGS. 6a–6c illustrates a comparison of scatter fractions from regularized method (squares), cubic polynomial method (diamonds) and Monte-Carlo simulation (triangles) for hot sphere phantoms with Tc$^{99m}$: (a) "far," (b) "on-axis," and (c) "near." FIGS. 7a–7b are a graphical comparison of scatter fractions from regularized method (squares), cubic polynomial method (diamonds) and Monte-Carlo simulation (triangles) for cold sphere phantom with Tc$^{99m}$; (a) along x-axis and (b) along y-aids.

With Tc$^{99m}$, the new method was tested on data from four different phantoms: hot sphere "near", "on-axis," "far," and cold sphere "on axis." For the hot sphere phantoms, the method was tested on a profile of spatial pixels along the x axis through the center of the sphere. Profiles of pixels were tested along both the x and y axes for the cold sphere phantom. The scatter fractions with a wide fitting window (WW) are compared with those from cubic polynomial and with those from Monte-Carlo simulation. Results are shown in FIGS. 6a–6c and 7a–7b. The scatter fractions from the three methods agree generally well for the hot sphere phantoms. For the cold sphere phantom, they have the same general trend, but their agreement at each location is not as good as with the hot sphere phantoms. The scatter fractions from the regularized method are generally smaller than those from Monte-Carlo simulation, whereas polynomial results are generally larger. The selection of the regularization parameter was by trial and error with criteria being the overall smoothness of the scatter fractions along the profile and their agreement with results from Monte-Carlo simulation. The final choice was 1 for the hot sphere phantoms and 5 for the cold sphere phantom, and it was fixed for all pixels in the same curve.

Figure 8A:
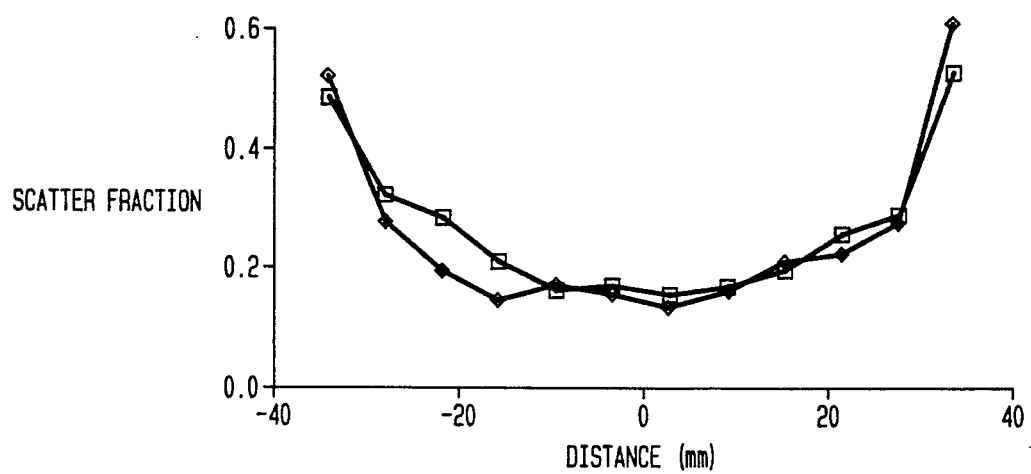
FIGS. 8a–8b are a graphical representation which compares scatter fractions from the energy regularized method (squares) and cubic polynomial method (diamonds) for hot sphere phantoms with $I^{131}$: (a) "far" and (b) "near."
Figure 8B:
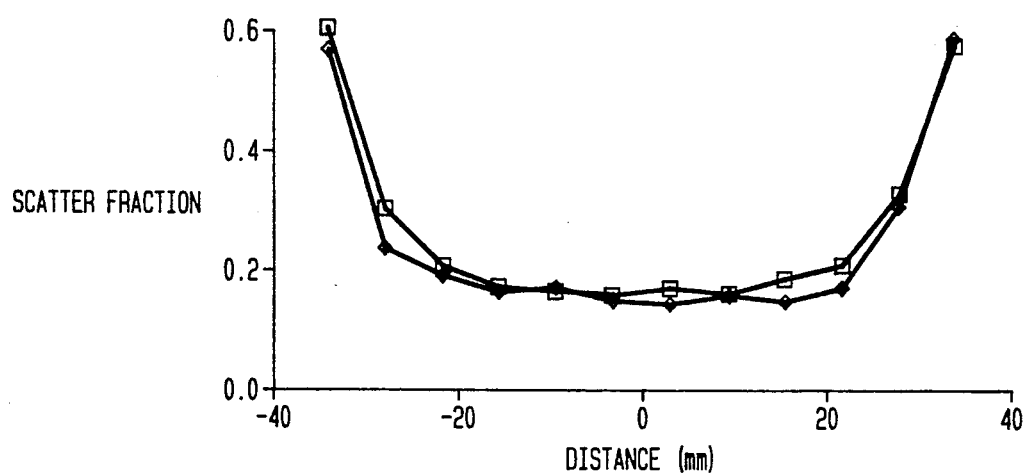

With $I^{131}$, tests were performed on data from two different phantoms: hot sphere "near" and "far." The scatter fractions from the regularized method are compared with those from the cubic polynomial method. The results shown in FIGS. 8a–8b are profiles of scatter fractions along the x-axis for the two phantoms. The comparison in this figure is of scatter fractions from regularized method (squares) and cubic polynomial method (diamonds) for hot sphere phantoms with $I^{131}$: (a) "far" and (b) "near." The regularization parameter was 5 for both. The fitting windows were wide. The scatter fractions from the two methods agree very well.

E. SEARCHING FOR OPTIMUM ENERGY SHIFT WITH TESTING USING ENERGY AND SPATIAL REGULARIZATION

With post-processing, one can search for the optimum value of the energy shift between the energy channel of the peak of the spectrum of the direct gamma rays from the patient or object and the energy channel of the peak of the scatter-free-source spectrum. This search is carried out as follows:

Choose a value for the shift. Then effectively shift the rows of the U matrix of Eq. (1) either up (toward lower energies) or down (toward higher energies) correspondingly. Any excess rows from the shift are effectively discarded. Any new rows are effectively included. Then carry out the minimization. Calculate the value of the quantity being minimized. Alternatively, one can calculate the value of the left quadratic norm in Eq. (1). Then choose a different value for the shift and repeat. Examine several shifts. Then choose the optimum energy shift as that value which yields the smallest value of the quantity being minimized. Alternatively, one can choose the optimum energy shift as that value which yields the smallest value of the left quadratic norm in Eq. (1). With the optimum shift chosen, the optimum solution to separating the scatter spectrum from the direct spectrum is the solution to the minimization that corresponds to that shift.

For energy plus spatial regularization, the same approach is applied to each of the $U_i$ matrices of Eq. (3).

The searching procedure described herein has been tested by the inventors experimentally with a $Tc^{99m}$ hot sphere at the "far" and "near" positions in a non-radioactive cylinder of water. Energy and spatial regularization was employed. The criterion used for choosing the optimum shift was that shift producing the smallest value of the left quadratic norm in Eq. (3). The results of this process are compared to those of other approaches for a location at the center of a sphere in Table 1, below.

TABLE 1

| | Scatter Fraction as a Function of Position and Method | | |
|---|---|---|---|
| POSITION | NO SHIFT | OPTIMUM SHIFT | MONTE-CARLO |
| "near" | 0.061 | 0.165 | 0.172 |
| "far" | 0.175 | 0.248 | 0.265 |

The values using the optimum shift are clearly closer to the Monte-Carlo prediction of the scatter fraction.

F. IMPLEMENTATION AS AN ON-LINE PROCESSING TECHNIQUE

The method of the present invention can also be implemented in real time as an on-line processing technique using either special hardware or general signal processor with special firmware. An example of this implementation for energy regularization is provided below. On-line implementation holds for all three aspects of the new invention.

A new n by m matrix T is introduced which is defined as:

$$T = \begin{pmatrix} t_{11} & t_{12} & \cdots & t_{1m} \\ t_{21} & t_{22} & \cdots & t_{2m} \\ \cdots & & & \\ t_{n1} & t_{n2} & \cdots & t_{nm} \end{pmatrix} \quad (13)$$

$$= (U^t U + \lambda Q^t W^t W Q)^{-1} Q^t.$$

Equation 2 can then be rewritten as:

$$c = Ta, \quad (14)$$

Further, define $$a = (a_1, a_2 \ldots, a_m)^t \quad , (15)$$

and $$f = (f_1, f_2, \ldots, f_m) \quad (16)$$

Then, the estimate of the amplitude of the unscattered spectrum is $$b = \sum_{i=1}^{m} t_{ni} a_i \quad (17)$$

The total number of direct (unscattered) events (denoted as $N_d$) at a particular location is:

$$N_d = b \sum_{i=1}^{m} f_i = f \sum_{i=1}^{m} t_{ni} a_i, \quad (18)$$

where:

$$f = \sum_{i=1}^{m} f_i.$$

Letting $t_i = f t_{ni}$, then:

$$N_d = \sum_{i=1}^{m} t_i a_i, \quad (19)$$

Since $t_i$ can be pre-computed and $a_i$ is the total number of detected events in the ith energy channel at a particular location, equation (19) can be implemented on-line in real time. That is, when an event with energy within the ith energy channel is detected at a particular spatial location, the memory for that particular location is incremented by $t_i$. At the end of the acquisition, the total collected image is the image of direct (unscattered) events.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A method of producing an image having reduced effects of Compton scattered photons detected in a gamma ray detection arrangement, the method comprising the steps of:

receiving data responsive to energy states of the detected photons and storing said data in memory locations corresponding to predetermined image grid points;

calibrating the gamma ray detection arrangement of by utilizing a spectral shape corresponding to a calibration function which is expected to correspond to a first data set corresponding to unscattered ones of the detected photons and by utilizing spectral shapes for mono-energetic gamma rays the energies of which are higher than the energy of the gamma ray of primary interest and by utilizing spectral shapes for mono-energetic gamma rays whose energies are lower than the energy of the gamma ray of primary interest;

processing said stored data for at least selected ones of said predetermined grid points using as a model of the unscattered spectrum a set of parameters, one for each energy channel, and employing minimization of a function which includes a product of an energy regulation term times an energy regularization parameter, for separating said stored data into said first data set corresponding to unscattered ones of the detected photons and a second data set corresponding to scattered ones of the detected photons;

summing said first data set for each of said selected ones of said predetermined grid points for determining a number of said unscattered ones of said detected photons; and forming the image utilizing said number of said unscattered ones of said detected photons.

2. The method of claim 1 wherein said step of minimization includes the further step of inverting a matrix.

3. The method of claim 2 wherein said step of minimization comprises the further steps of:

preselecting an energy regularization parameter;

saving the results of said step of inverting in a computer memory; and computing the image in real time.

4. A method of producing an image having reduced effects of Compton scattered photons detected in a gamma ray detection arrangement, the method comprising the steps of:

receiving data responsive to energy states of the detected photons and storing said data in memory locations corresponding to predetermined image grid points;

calibrating the gamma ray detection arrangement by utilizing a spectral shape corresponding to a calibration function which is expected to correspond to a first data set corresponding to unscattered ones of the detected photons;

processing said stored data for at least selected ones of said predetermined grid points employing a minimization of a function which includes a product of a spatial regularization term times a spatial regularization parameter, for separating said stored data into said first data set corresponding to unscattered ones of the detected photons and a second data set corresponding to scattered ones of the detected photons;

summing said first data set for each of said selected ones of said predetermined grid points for determining a number of said unscattered ones of said detected photons; and forming the image utilizing said number of said unscattered ones of said detected photons.

5. The method of claim 4 wherein said step of minimization comprises the further step of inverting a matrix.

6. The method of claim 4 wherein said step of minimization comprises the further steps of:

preselecting the spatial regularization parameter;

storing the results of said invention in a computer memory; and computing the image in real time.

7. A method of producing an image having reduced effects of Compton scattered photons detected in a gamma ray detection arrangement, the method comprising the steps of:

receiving data responsive to energy states of the detected photons and storing said data in memory locations corresponding to predetermined image grid points;

grouping said stored data, whereby a coarser grid having fewer image grid points is produced;

calibrating the gamma ray detection arrangement by utilizing a spectral shape corresponding to a calibration function which is expected to correspond to a first data set corresponding to unscattered ones of the detected photons and by utilizing spectral shapes for mono-energetic gamma rays whose energies are higher than the energy of the gamma ray of primary interest and by utilizing spectral shapes for mono-energetic gamma rays whose energies are lower than the energy of the gamma ray of primary interest;

processing said stored data for at least selected ones of said predetermined grid points using as a model of the unscattered spectrum a set of parameters, one for each energy channel, and employing minimization of a function which includes a product of an energy regularization term times an energy regularization parameter, for separating said stored data into said first data set corresponding to unscattered ones of the detected photons and a second data set corresponding to scattered ones of the detected photons;

summing said second data set for each of said predetermined grid points on said coarser grid for determining a number of said scattered ones of said detected photons;

interpolating from said second data set for each of said predetermined grid points on said coarser grid for producing a data set corresponding to said scattered ones of the detected photons for each of said predetermined number of grid points;

subtracting said data set corresponding to said scattered ones of the detected photons for each of said predetermined number of grid points from a summation of said stored data corresponding to the detected photons for each of said predetermined number of grid points, to produce at each of said predetermined number of grid points a data set corresponding to unscattered ones of the detected photons; and forming the image utilizing said number of said unscattered ones of said detected photons.

8. A method of producing an image having reduced effects of Compton scattered photons detected in a gamma ray detection arrangement, the method comprising the steps of:

receiving data responsive to energy states of the detected photons and storing said data in memory locations corresponding to predetermined image grid points;

grouping said stored data, whereby a coarser grid having fewer image grid points is produced;

calibrating the gamma ray detection arrangement by utilizing a spectral shape corresponding to a calibration function which is expected to correspond to a first data set corresponding to unscattered ones of the detected photons and by utilizing spectral shapes for mono-energetic gamma rays the energies of which are higher than the energy of the gamma ray of primary interest and by utilizing spectral shapes for mono-energetic gamma rays the energies of which are lower than the energy of the gamma ray of primary interest;

processing said stored data for at least selected ones of said predetermined grid points using as a model of the unscattered spectrum a set of parameters, one for each energy channel, and employing minimization of a function which includes a product of an energy regularization term times an energy regularization parameter, for separating said stored data into said first data set corresponding to unscattered ones of the detected photons and a second data set corresponding to scattered ones of the detected photons;

summing said first data set for each of said predetermined grid points on said coarser grid for determining a number of said unscattered ones of said detected photons;

interpolating from said first data set for each of said predetermined grid points on said coarser grid for producing a data set corresponding to said unscattered ones of the detected photons for each of said predetermined number of grid points; and forming the image utilizing said number of said unscattered ones of said detected photons.

9. A method of producing an image having reduced effects of Compton scattered photons detected in a gamma ray detection arrangement, the method comprising the steps of:

receiving data responsive to energy states of the detected photons and storing said data in memory locations corresponding to predetermined image grid points;

grouping said stored data, whereby a coarser grid having fewer image grid points is produced;

calibrating the gamma ray detection arrangement by Utilizing a spectral shape corresponding to a calibration function which is expected to correspond to a first data set corresponding to unscattered ones of the detected photons and by utilizing spectral shapes for mono-energetic gamma rays whose energies are higher than the energy of the gamma ray of primary interest and by utilizing spectral shapes for mono-energetic gamma rays whose energies are lower than the energy of the gamma ray of primary interest;

processing said stored data for at least selected ones of said predetermined grid points using as a model of the unscattered spectrum a set of parameters, one for each energy channel, and employing minimization of a function which includes a product of an energy regularization term times an energy regularization parameter, as well as a product of a spatial regularization term times a spatial regularization parameter for separating said stored data into said first data set corresponding to unscattered ones of the detected photons and a second data set corresponding to scattered ones of the detected photons;

summing said first data set for each of said predetermined grid points on said coarser grid for determining a number of said unscattered ones of said detected photons;

interpolating from said first data set for each of said predetermined grid points on said coarser grid for producing a data set corresponding to said unscattered ones of the detected photons for each of said predetermined number of grid points; and forming the image utilizing said number of said unscattered ones of said detected photons.

10. A method of producing an image having reduced effects of Compton scattered photos detected in a gamma ray detection arrangement, the method comprising the steps of:

receiving data responsive to energy states of the detected photons and storing said data in memory locations corresponding to predetermined image grid points;

grouping said stored data, whereby a coarser grid having fewer image grid points is produced;

calibrating the gamma ray detection arrangement by utilizing a spectral shape corresponding to a calibration function which is expected to correspond to a first data set corresponding to unscattered ones of the detected photons;

processing said stored data for at least selected ones of said predetermined grid points employing minimization of a function which includes a product of a spatial regularization term times a spatial regularization parameter, for separating said stored data into said first data set corresponding to unscattered ones of the detected photons and a second data set corresponding to scattered ones of the detected photons;

summing said first data set for each of said predetermined grid points on said coarser grid for determining a number of said unscattered ones of said detected photons;

interpolating from said first data set for each of said predetermined grid points on said coarser grid for producing a data set corresponding to said unscattered ones of the detected photons for each of said predetermined number of grid points; and forming the image utilizing said number of said unscattered ones of said detected photons.

11. A method of producing an image having reduced effects of Compton scattered photons detected in a gamma ray detection arrangement, the method comprising the steps of:

receiving data responsive to energy states of the detected photons and storing said data in memory locations corresponding to predetermined image grid points;

calibrating the gamma ray detection arrangement by acquiring a spectral shape corresponding to a calibration function which is expected to corresponding to a first data set corresponding to unscattered ones of the detected photons and by acquiring spectral shapes for mono-energetic gamma rays whose energies are higher than the energy of the gamma ray of primary interest and by acquiring spectral shapes for mono-energetic gamma rays whose energies are lower than the energy of the gamma ray of primary interest;

processing said stored data for at least selected ones of said predetermined grids point using as a model of the unscattered spectrum a set of parameters, one for each energy channel, and employing minimization of a function which includes a product of an of a spatial regularization term times a spatial regularization parameters for separating said stored data into said first data set corresponding to unscattered ones of the detected photons and a second data set corresponding to scattered ones of the detected photons;

summing said first data set for each of said selected ones of said predetermined grid points for determining a number of said unscattered ones of said detected photons; and forming the image utilizing said number of said unscattered one of said detected photons.

12. The method of claim 11 wherein said step of minimization involves inverting a matrix.

13. The method of claim 12 wherein said step of minimization involving a matrix comprises the further step of preselecting the energy regularization parameter as well as the spatial regularization parameter so that the results of invention can be saved in computer memory and the image computed on line in real time.

14. A method of producing an image having reduced effects of Compton scattered photons detected in a gamma ray detection arrangement, the method comprising the steps of:

receiving data responsive to energy states of the detected photons and storing said data in memory locations corresponding to predetermined image grid points;

calibrating the gamma ray detection arrangement by utilizing a spectral shape corresponding to a calibration function which is expected to correspond to a first data set corresponding to unscattered ones of the detected photons and by utilizing spectral shapes for mono-energetic gamma rays the energies of which are higher than the energy of the gamma ray of primary interest and by utilizing spectral shapes for mono-energetic gamma rays, the energies of which are lower than the energy of the gamma ray of primary interest;

processing said stored data for at least selected ones of said predetermined grid points using as a model of the unscattered spectrum a set of parameters, one for each energy channel, and employing minimization of a function which includes a product of an energy regularization term times an energy regularization parameters, stepping through various values of energy shift, performing a minimization for each, and choosing the correct shift by a specified criterion, for separating said stored data into said first data set corresponding to unscattered ones of the detected photons and a second data set corresponding to scattered ones of the detected photons;

summing said first data set for each of said selected ones of said predetermined grid points for determining a number of said unscattered ones of said detected photons; and forming the image utilizing said number of said unscattered ones of said detected photons.

15. A method of producing an image having reduced effects of Compton scattered photons detected in a gamma ray detection arrangement, the method comprising the steps of:

receiving data responsive to energy states of the detected photons and storing said data in memory locations corresponding to predetermined image grid points;

calibrating the gamma ray detection arrangement by utilizing a spectral shape corresponding to a calibration function which is expected to corresponding to a first data set corresponding to unscattered ones of the detected photons and by utilizing spectral shapes for mono-energetic gamma rays the energies of which are higher than the energy of the gamma by of primary interest and by utilizing spectral shapes for mono-energetic gamma rays, the energies of which are lower than the energy of the gamma ray of primary interest;

processing said stored data for at least selected ones of said predetermined grid points using as a model of the unscattered spectrum a set of parameters, one for each energy channel, and employing minimization of a function which includes a product of an energy regularization term times an energy regularization parameters, as well as a product of a spatial regularization term times a spatial regularization parameter, stepping through various values of energy shift, performing a minimization for each, and choosing the correct shift by a specified criterion, for separating said stored data into said first data set corresponding to unscattered ones of the detected photons and a second data set corresponding to scattered ones of the detected photons;

summing said first data set for each of said selected ones of said predetermined grid points for determining a number of said unscattered ones of said detected photons; and forming the image utilizing said number of said unscattered ones of said detected photons.

* * * * *

UNITED STATES PATENT AND TRADEMARK OFFICE
CERTIFICATE OF CORRECTION

PATENT NO. : 5,315,506
DATED : May 24, 1994
INVENTOR(S) : Xiaohan Wang, *et al.*

It is certified that error appears in the above-indentified patent and that said Letters Patent is hereby corrected as shown below:

Column 2, line 12, prior to "entitled" insert --is--.

Column 2, line 21, delete "Le.," and insert --i.e.,--.

Column 7, line 37, delete "Te$^{99m}$" and insert --Tc$^{99m}$--.

Column 7, line 49, delete "on-aids" and insert --"on-axis"--.

Column 9, line 2, delete "similarly" and insert --similar--.

Column 9, line 42, delete $$\text{min}\{\|\bar{a} - \bar{U}\bar{c}\| + \lambda E\|\overline{\overline{W}}\overline{\overline{Q}}_E \bar{c}\| + \lambda_x \|\overline{Q}_x \bar{c}\|\}$$

and insert $$-- \text{min}\{\|\tilde{a} - \tilde{U}\tilde{c}\| + \lambda_E\| \tilde{W}\tilde{Q}_E \tilde{c}\| + \lambda_x \|Q_x \tilde{c}\|\}, --$$

UNITED STATES PATENT AND TRADEMARK OFFICE
CERTIFICATE OF CORRECTION

PATENT NO. : 5,315,506
DATED : May 24, 1994
INVENTOR(S) : Xiaohan Wang, *et al.*

It is certified that error appears in the above-indentified patent and that said Letters Patent is hereby corrected as shown below:

Column 9, line 44, delete "where a is of length 5 m, cis of length 5 n; U is of size 5" and insert --where $\tilde{a}$ is of length $5m$, $\tilde{c}$ is of length $5n$; $\breve{U}$ is of size 5--.

Column 9, line 45, delete "m by 5 n; QE, W and $Q_x$ are of size 5 n by 5 n. For this" and insert:

--m by $5n$; $\tilde{Q}_E$, $\tilde{W}$ and $\tilde{Q}_x$ are of size $5n$ by $5n$. For this--.

Column 9, line 60, delete "U" and insert --$\hat{U}$--.

Column 10, line 7, after "also", please insert --be--.

Column 10, line 55, delete "key," and insert --keV--.

UNITED STATES PATENT AND TRADEMARK OFFICE
CERTIFICATE OF CORRECTION

PATENT NO. : 5,315,506
DATED : May 24, 1994
INVENTOR(S) : Xiaohan Wang, *et al.*

It is certified that error appears in the above-indentified patent and that said Letters Patent is hereby corrected as shown below:

Column 10, line 60, delete:

"$a=[I(x_i,y_j,e_1),\ldots,I(x_i,y_j,e_{32})]', ij=1,\ldots,128$" and insert

-- $\mathbf{a} = [I(x_i,y_j,e_1), \cdots, I(x_i,y_j,e_{32})]', i,j=1,\cdots,128$ --

Column 12, line 10, delete "key" and insert --keV--.

Column 12, line 24, delete "A" and insert --$\lambda$--.

Column 12, line 26, delete "Le.," and insert --i.e.,--.

Column 12, line 61, delete "y-aids" and insert --y-axis--.

Column 14, line 33, delete "$=(U^tU+\lambda Q^tW^tWQ)^{-1}Q^t$" and insert

-- $= (U^tU + \lambda Q^tW^tWQ)^{-1}U^t$ --

UNITED STATES PATENT AND TRADEMARK OFFICE
CERTIFICATE OF CORRECTION

PATENT NO. : 5,315,506
DATED : May 24, 1994
INVENTOR(S) : Xiaohan Wang, *et al.*

It is certified that error appears in the above-indentified patent and that said Letters Patent is hereby corrected as shown below:

Column 14, line 44, delete "$f=(f_1,f_2,\ldots,f_m)$" and insert $$-\!\!-f=(f_1,f_2,\ldots,f_m)^t-\!\!-.$$

Column 15, line 26, delete "of".

Column 16, line 28, delete "invention" and insert --inversion--.

Column 18, line 2, delete "Utilizing" and insert --utilizing--.

Column 18, line 37, delete "photos" and insert --photons--.

Column 19, line 27, after "of", insert --an energy regulation term times an energy regularization parameter, as well as a product of--.

Column 19, line 28, delete "parameters" and insert --parameter--.

UNITED STATES PATENT AND TRADEMARK OFFICE
CERTIFICATE OF CORRECTION

PATENT NO. : 5,315,506

DATED : May 24, 1994

INVENTOR(S) : Xiaohan Wang, *et al.*

It is certified that error appears in the above-indentified patent and that said Letters Patent is hereby corrected as shown below:

Column 19, line 45, delete "invention" and insert --inversion--.

Column 20, line 9, delete "parameters" and insert --parameter--.

Column 20, line 48, delete "parameters" and insert --parameter--.

Signed and Sealed this

Eighteenth Day of February, 1997

Attest:

BRUCE LEHMAN

*Attesting Officer*  *Commissioner of Patents and Trademarks*